UNITED STATES PATENT OFFICE.

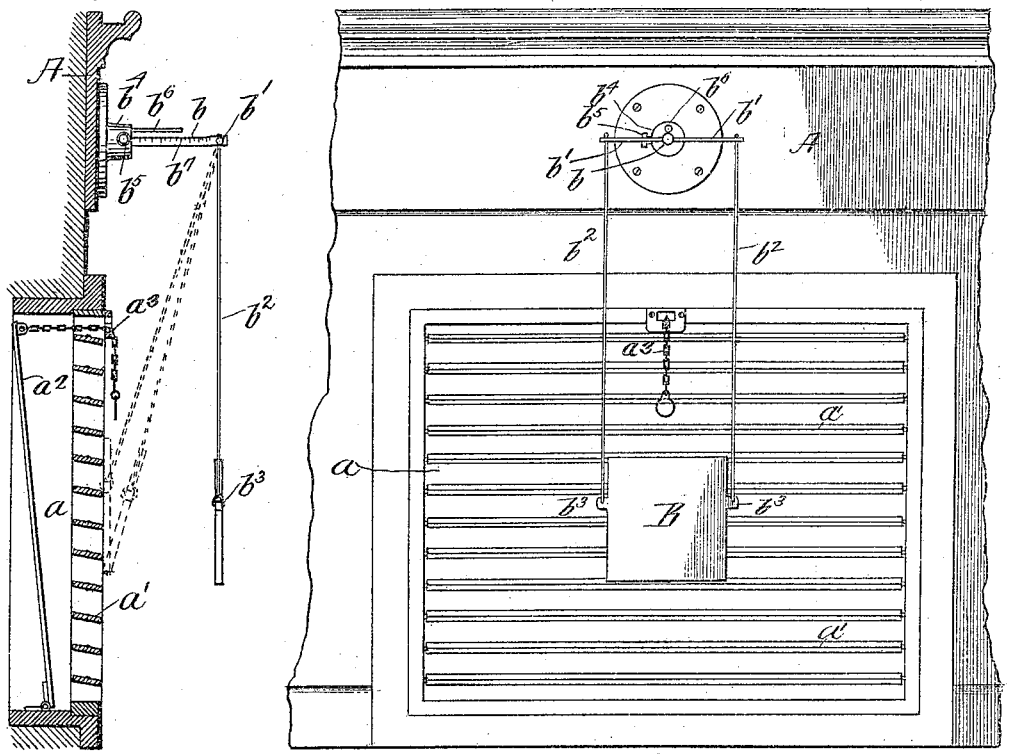

GEORGE H. WHITCHER, OF BERLIN, NEW HAMPSHIRE.

DEVICE FOR DETERMINING THE FORCE OR VELOCITY OF FLUIDS.

949,788.  Specification of Letters Patent.  Patented Feb. 22, 1910.

Application filed October 17, 1907. Serial No. 397,825.

*To all whom it may concern:*

Be it known that I, GEORGE H. WHITCHER, of Berlin, in the county of Coos and State of New Hampshire, a citizen of the United States, have invented a new and useful Improvement in Devices for Determining the Force or Velocity of Fluids, of which the following is a full, clear, and exact description, reference being had to the accompanying drawings, forming a part of this specification, in explaining its nature.

My invention relates to a means or device for determining the force or velocity of fluids in motion and especially for determining the force or velocity of the flow of air into or out of a room by means of which determination regulation may be made for obtaining a proper ventilation of the room.

The essential objects of my invention are to provide a device of simple construction, inexpensive, easy to use, and exact and definite in its determination of measurement. All these objects I attain in the device constituting my invention, which can best be seen and understood by reference to the drawings, in which—

Figure 1 shows a sectional view of the device in operative position. Fig. 2 shows a view thereof in front elevation. Fig. 3 shows in enlarged detail a portion of the device to which reference will hereinafter be made. Fig. 4 shows a face view of the portion referred to in Fig. 3. Fig. 5 represents in side elevation a detail of construction to which special reference will hereinafter be made.

In the drawings:—A represents diagrammatically the wall of a room and $a$ an opening in the wall crossed by bars $a^1$ forming a grille as is ordinarily the custom. Back of this opening is arranged a swinging damper $a^2$ controlled by a chain $a^3$ the end of which is accessible from inside the room. By changing the position of this damper the velocity of the air flowing through the opening $a$ may be controlled.

In the front of the grated opening $a$, on the side from which the air enters, I place an air-intercepting plate or member B. This member is so placed that it lies fairly within the path which a current of air takes in entering to pass through said opening so as to intercept and be influenced by such current of air to be moved thereby in the direction of the opening. The member preferably has the form of a plate made of some light material and is so supported that it may easily be moved from a normal position by a current of air acting upon it. The best mode of obtaining such support I have found to consist in simply suspending the intercepting member or plate from a supporting head, the member gravitating to assume a normal position and being easily deflected or blown by a current of air from such position. The intercepting member B is supported to hang in a pendent position from a rod $b$ on which is arranged a crosshead or fixture $b^1$ from opposite ends of which there depend connections $b^2$ which are attached to the air-intercepting member preferably on opposite sides thereof. In this connection it is to be noted that the attachment of the connections $b^2$ to the intercepting member B is preferably made at points a little above the horizontal medial line thereof in order that such member may hang in a proper pendent upright position. Besides this, the attachment of the connections $b^2$ to the member B should be such that the member or plate may swing or turn freely on or relatively to the connections $b^2$. Such attachment may be made by forming loops on the ends of the connections which pass through bosses $b^3$ projecting from the respective sides of the intercepting member. See Fig. 5. The crosshead $b^1$ as before described is arranged upon the end of a rod $b$. This rod is mounted to slide into and out of a block $b^4$ which is fastened to the wall of the room or other base of support above the opening $a$ and by which sliding adjustment of the rod the air-intercepting member B may be made to hang at such proper distance from the opening through which the air is passing as may be desired. The sliding rod $b$ may be held at any adjusted position by a thumb screw $b^5$ which extends through the block $b^4$ and engages with the side of the rod.

As may be inferred, the objective point which I wish to attain by the arrangement of the apparatus above described is to determine the exact distance which the air-intercepting member B is moved or blown by the air. Such distance, of course, varies depending upon the velocity of the current. The faster the current of air is flowing the more will the intercepting member or plate be moved or blown from its normal position. If a light current of air is passing then the intercepting member or plate will be moved but a short distance. Now assuming that the face of the grille defines the limit of distance or stop against which the air-intercepting member B may be moved or blown by a current of air from the normal pendent position of such member, it may readily be determined by adjusting the position of the intercepting member just how far the member must be removed from the face of the grille for a current of air to move the intercepting member to just contact therewith and which determines, of course, the distance which the intercepting member B is moved by such current of air.

It may be ascertained when the air-intercepting member has been moved far enough away from the face of the grille or other objective point so that when moved or blown by a current of air it will just contact with the face of the grille or stop in the following manner: As was before described, the intercepting member B is so supported or hung that it assumes a normal position substantially parallel with the face of the grille. Now as the intercepting member is moved by the air it will assume an angular relationship to the face of the grille, this angular position becoming more obtuse the farther the member is moved. The angular variation is such that one portion of the intercepting member, which in the form of apparatus shown is the lower edge thereof, will first contact with the face of the grille or stop, the rest of the member assuming an angular position with relation thereto as shown in Fig. 1. If the current of air is strong enough to move the air-intercepting member a greater distance than the precise distance which would separate the normal position of the member from the face of the grille, or in other words, if the intercepting member has not been moved far enough away from the face of the grille so that the current of air will just move the member to contact therewith, then such current will change the angular position of the member contacting with the face of the grille, as before described, into a position where it rests flatly against the side of the grille or stop as shown in Fig. 1. When the air-intercepting member has been moved so as to just contact with or reach the face of the grille or other objective point the intercepting member will, as said before, first contact with the grille by the lower edge thereof bearing against the grille, the member occupying an angular position with respect thereto. Now if the velocity of the air current be more than sufficient to move the intercepting member to just touch or contact with the grille, or, in other words, if the member is not moved sufficiently far away from the grille the air will act to move the intercepting member flat up against the side of the grille, the member turning upon the connections $b^2$ by which it is suspended to hang pendent from the fixture above. It may accordingly be determined with remarkable accuracy just how far the intercepting member must be removed from the grille or other objective point through or by which the current of air is passing for such current of air to just move or blow the air-intercepting member thereto. In other words, the distance which the intercepting member is moved by the current of air is accurately determined.

Having provided means by which it is determined just how far a current of air is moving the air-intercepting member from its normal position, or, in other words, just how far the air intercepting member must be moved away from the grille in order for the air current to move the member to just contact with it, the force or velocity of such current of air is determined in the following manner: As was before described, the amount of distance which the air-intercepting member is moved by a current of air indicates the distance which will separate the air-intercepting member in its normal position from the face of the grille or other objective point through or by which the current of air is passing, for it is by adjusting the position of the air-intercepting member relatively to the grille or other objective point that the distance is determined over which the current of air acting upon the intercepting member is moving it. Now it is found out by computation just what distance must separate the air-intercepting member from the face of the grille or other objective point through or by which the air is passing, so that air moving at a certain determinate velocity will just move said member to touch or contact with the face of the grille or reach such objective point as before described. This having been determined, the velocity of any current of air may be found out after first ascertaining the distance which such current of air is moving the intercepting member; or if it be desired that the air shall pass through the opening with a certain determinate velocity, then the intercepting member may be set at such determinate distance away from the grille or other objective point as will indicate that air moving at the desired determinate velocity will just move the intercepting member such determinate distance, then by adjusting the damper or other means controlling the opening through which the air is passing the flow of air is so modified that a current is found which will just move the intercepting member the determinate distance previously ascertained; then it is found that the air is moving through the opening at the desired velocity.

In practice I prefer that there may be a permanent indication of the distance which separates the intercepting member from the grille or other objective point when the air is moving at a determinate velocity. This indication may be by means of an indicator $b^6$ consisting preferably of a rod which is driven into the block $b^4$ through which the rod $b$ slides and from which the air-intercepting member is dependent. The indicator $b^6$ is so arranged that its end or determinate point thereon will be just in line with the tabulated point $b^7$ on the sliding rod $b$ which indicates that the air-intercepting member is in proper position away from the grille or other objective point to be moved by such determinate current of air just the distance above referred to. Then by means of further tabulations bearing a proper computative relationship to the fixed end or determinate point on the indicator it may be determined at just what velocity any current of air is moving after first finding out just how far the sliding rod $b$ will have to be moved so that the air-intercepting member depending from it will be moved to just contact with the face of the grille or other objective point by or through which the air is passing. Then the tabulated reading of the sliding scale just opposite the end of the indicator or other determinate point thereon will show how fast the air is moving. On the other hand in substantially the manner as before explained, if it is desired to have the air pass through the opening with a determinate velocity, then the sliding rod may be so set relatively to the end of the indicator that the intercepting member connecting therewith will be set at such determinate distance away from the grille or other objective point as will indicate that air moving at a desired determinate velocity will just move the intercepting member such determinate distance, then by adjusting the damper or other means controlling the opening through which the air is passing the flow of air is so modified that a current is found which will just move the intercepting member the distance previously determined, then it is known that the air is moving through the opening with the desired velocity.

The device in practice has been found by those skilled in the art to be as accurate or even more accurate than the complicated and expensive instruments for measuring the force or velocity of air now in common use.

While I have described the device as one used for purposes of measuring the velocity of air and to which use it is essentially applicable, the device may also be used for the purpose of measuring velocities of any fluid current, as for example, the velocity of the flow of water.

Having thus fully described my invention, I claim and desire to secure by Letters Patent of the United States:—

1. In a device for measuring the force or velocity of fluids, the combination with an objective fixed member of a fluid-intercepting member movable by a fluid current in which said intercepting member is supported to hang, indicating means for defining a set position of said intercepting member relatively to said objective fixed member when a current of known velocity moving toward said fixed member and in which current said intercepting member is set, will move said intercepting member to just contact with said objective fixed member, and means for supporting said intercepting member to hang in said current as aforesaid and which supporting means is also adapted and arranged to the end that the position of said intercepting member may be changed relatively to said indicating means and said fixed member, substantially as and for the purposes set forth.

2. In a device for measuring the force or velocity of fluids, a fluid-intercepting member, a supporting fixture, and means connected with said fixture by which said intercepting member is suspended to hang in an upright position and swing relatively to said fixture when said member is actuated by a fluid current and to which means of suspension said intercepting member is attached whereby it may turn relatively thereto.

3. In a device for measuring the force or velocity of fluids, the combination with an objective fixed member located in the path of a fluid current, of a movable fluid-intercepting member likewise arranged in the path of said current, and means for adjustably supporting said intercepting member whereby it may be suspended at a determinate distance away from said objective fixed member and be deflected by said current toward the same to contact therewith.

4. In a device for measuring the force or velocity of fluids, the combination with an objective fixed member located in the path of a fluid current, of a fluid-intercepting member likewise arranged in the path of said current away from said fixed member, an adjustable fixture from which said intercepting member is suspended whereby it may be deflected by said current at a fixed and determinate position away from said fixed member and be moved toward said fixed member to contact therewith, and means for suspending said intercepting member from said fixture whereby the angular deflected position of said intercepting member may become relatively changed with respect to said objective fixed member.

5. In a device for measuring the force or velocity of fluids, the combination with a fixed member located in the path of a fluid current of an intercepting member likewise arranged in the path of said current in front of said fixed member, adjustable means for supporting said intercepting member whereby it may be suspended to hang in said current a set and determinate distance away from said fixed member and be deflected by the actuating influence of said current toward said fixed member to contact therewith, and means for defining a set position of said intercepting member relatively to said fixed member when a current of known velocity will deflect and move said intercepting member to just contact with said fixed member.

6. In a device for measuring the force or velocity of fluids, the combination with a fixed member located in the path of a fluid current, of a fluid-intercepting member likewise arranged in the path of said current in front of said fixed member, an indicator for defining a set position of said intercepting member away from said fixed member when a current of known velocity will move said intercepting member to just contact with said fixed member, a fixture adjustable with respect to said indicator, and means for suspending said intercepting member from said fixture to hang in said current as aforesaid and whereby the position of said intercepting member may be changed relatively to said indicator and said fixed member, substantially as and for the purposes set forth.

7. In a device for measuring the force or velocity of fluids, a fluid-intercepting member, an adjustable fixture from which said member is suspended, said fixture comprising in part a sliding rod slidable in relation to an objective point, said rod having tabulations thereon, means connecting said intercepting member with said fixture and supporting said intercepting member to hang in an upright position whereby it may be deflected by a fluid current acting against the same toward said objective point, and an indicator for defining a proper adjusted position of said sliding rod and the consequent proper position of said intercepting member relatively to said objective point when said intercepting member is being acted upon by a current of known velocity.

8. In a device for measuring the force or velocity of fluids, the combination with an objective fixed member located in the path of a fluid current of a fluid intercepting member also arranged in the path of said current and deflectable toward said fixed member to contact therewith, an indicator for defining a set position of said intercepting member away from said fixed member when a current of known velocity will move said intercepting member to just contact with said fixed member, a fixture adjustable relatively to said objective member and indicator and from which fixture said intercepting member is supported to hang in said current and be deflected as aforesaid, and means for supporting said member from said fixture.

9. In a device for measuring the force or velocity of fluids, a fluid intercepting member, a head from which said member is suspended, means connecting said member with said head and supporting said member to hang in an upright position whereby it may be moved by a current acting against the same, a sliding rod to which said head is fixed and by which said intercepting member may be moved relatively to an objective point located in the path of said current, and an indicator for defining a proper adjusted position of said sliding rod and the consequent proper position of said intercepting member relative to said objective point when said intercepting member is being acted upon by a current of known velocity.

GEORGE H. WHITCHER.

In the presence of—
DANIEL J. DALLY,
EDMUND SULLIVAN.